US00RE47282E

(19) United States
(12) Reissued Patent
Tompkin et al.

(10) Patent Number: US RE47,282 E
(45) Date of Reissued Patent: Mar. 12, 2019

(54) SPEAKERPHONE

(71) Applicant: Polycom, Inc., San Jose, CA (US)

(72) Inventors: Crispian Tompkin, Los Angeles, CA (US); Luke David Springer, El Segundo, CA (US); Anthony Martin Duys, Merrimac, MA (US); Alexander Baker Ekrut, Austin, TX (US); Richard J. Montague, Cupertino, CA (US); Jochen Eidam, Los Gatos, CA (US)

(73) Assignee: Polycom, Inc., San Jose, CA (US)

(21) Appl. No.: 29/638,676

(22) Filed: Feb. 28, 2018

Related U.S. Patent Documents

Reissue of:
(64) Patent No.: Des. 760,201
Issued: Jun. 28, 2016
Appl. No.: 29/518,227
Filed: Feb. 20, 2015

U.S. Applications:
(62) Division of application No. 29/620,772, filed on May 31, 2017, now Pat. No. Re. 46,940, which is an application for the reissue of Pat. No. Des. 760,201.

(51) LOC (11) Cl. ..... 14-01
(52) U.S. Cl.
USPC ..... D14/221
(58) Field of Classification Search
USPC ..... D14/149, 150, 155, 159, 215, 217, 218, D14/221, 225, 229, 240, 299; D13/108; D21/331

(Continued)

(56) References Cited

U.S. PATENT DOCUMENTS 4,363,482 A 12/1982 Goldfarb
D283,124 S * 3/1986 Kolb ..... D14/210

(Continued)

FOREIGN PATENT DOCUMENTS

TW D108485 8/1994

OTHER PUBLICATIONS

Xing Conference Phone for Skype, <URL: www.ipevo.com>, retrieved from Internet Jan. 31, 2008.

(Continued)

*Primary Examiner* — Philip S Hyder
(74) *Attorney, Agent, or Firm* — Blank Rome, LLP

(57) CLAIM

The ornamental design for a speakerphone, as shown and described.

DESCRIPTION

*This application is a reissue divisional application of U.S. Design application Ser. No. 29/620,772, now U.S. Design Pat. No. RE46,940, which issued on Jun. 20, 2018 and is a reissue of U.S. Design Pat. No. D760,201, which issued on Jun. 28, 2016 from U.S. Design application Ser. No. 29/518, 227, filed on Feb. 20, 2015, the contents of which applications are entirely incorporated by reference herein.*

FIG. 1 is a perspective view showing a top, a front, and a left side of a speakerphone according to our new design;
FIG. 2 is an elevational view of the front of the speakerphone;
FIG. 3 is an elevational view of a back of the speakerphone;
FIG. 4 is an elevational view of the left side of the speakerphone;
FIG. 5 is an elevational view of a right side of the speakerphone; and
FIG. 6 is a plan view of the top of the speakerphone; and,
FIG. 7 is a plan view of a bottom of the speakerphone.
The broken lines showing in FIGS. [1-5 and 7] *1-7* are for illustrative purposes only and form no part of the claimed design.

(Continued)

(Amended)

The grid of circular apertures schematically depicted in FIGS. [1-6] *1-2, and 6* is continuous throughout the surfaces on which the apertures are shown.

1 Claim, 4 Drawing Sheets

Matter enclosed in heavy brackets [ ] appears in the original patent but forms no part of this reissue; matter printed in italics indicates the additions made by reissue.

(58) Field of Classification Search
CPC . H04M 3/42; H04M 1/20; H04M 1/22; H04R 1/02; H04R 3/00; H04R 1/28
See application file for complete search history.

(56) References Cited

U.S. PATENT DOCUMENTS

| | | | | | |
|---|---|---|---|---|---|
| D292,090 | S | * | 9/1987 | Shintomi | D14/141.1 |
| D292,283 | S | * | 10/1987 | Matsuda | D14/212 |
| D303,522 | S | * | 9/1989 | Meda | D14/142 |
| 4,875,234 | A | * | 10/1989 | Tragatschnig | H04M 1/02 379/368 |
| D308,701 | S | | 6/1990 | Kojima | |
| D309,161 | S | | 7/1990 | Leung | |
| D311,541 | S | | 10/1990 | Carre | |
| D327,479 | S | | 6/1992 | Britz | |
| D332,948 | S | * | 2/1993 | Barr | D14/392 |
| D342,732 | S | | 12/1993 | Hinman et al. | |
| D368,721 | S | | 4/1996 | Howell et al. | |
| D375,090 | S | | 10/1996 | Lambert et al. | |
| D382,265 | S | | 8/1997 | Wakefield | |
| D382,266 | S | | 8/1997 | Wakefield | |
| D396,716 | S | | 8/1998 | Matsuda et al. | |
| D403,328 | S | * | 12/1998 | Wakefield | D14/229 |
| D406,841 | S | | 3/1999 | Myung | |
| D411,995 | S | | 7/1999 | Chen | |
| 6,016,346 | A | | 1/2000 | Rittmueller et al. | |
| D419,997 | S | | 2/2000 | Montalbo et al. | |
| D421,606 | S | | 3/2000 | Montalbo et al. | |
| D431,236 | S | | 9/2000 | Read et al. | |
| D434,747 | S | | 12/2000 | Bird et al. | |
| D439,538 | S | | 3/2001 | Lynch | |
| D444,777 | S | | 7/2001 | Bird et al. | |
| D448,754 | S | | 10/2001 | Chang | |
| D449,285 | S | | 10/2001 | Wakefield et al. | |
| D449,286 | S | | 10/2001 | Wakefield et al. | |
| D457,150 | S | | 5/2002 | Chen | |
| D461,179 | S | | 8/2002 | Christianson | |
| D463,410 | S | | 9/2002 | Strand et al. | |
| D473,546 | S | | 4/2003 | Hovanky et al. | |
| D474,169 | S | | 5/2003 | Fletcher | |
| D478,560 | S | | 8/2003 | Misrahi et al. | |
| D480,059 | S | | 9/2003 | Misrahi et al. | |
| D481,371 | S | | 10/2003 | Chen | |
| D488,794 | S | | 4/2004 | Chen | |
| D489,358 | S | * | 5/2004 | Chen | D14/215 |
| D491,909 | S | | 6/2004 | Sun | |
| D499,392 | S | | 12/2004 | Bathurst et al. | |
| D536,327 | S | | 2/2007 | Lukic et al. | |
| D556,179 | S | | 11/2007 | Chang | |
| D557,675 | S | | 12/2007 | Diebel et al. | |
| D557,676 | S | | 12/2007 | Suzuki et al. | |
| D566,682 | S | | 4/2008 | Marash | |
| D571,776 | S | * | 6/2008 | Duys | D14/150 |
| D576,156 | S | | 9/2008 | Wilson et al. | |
| D579,911 | S | * | 11/2008 | Wei | D14/155 |
| 7,480,502 | B2 | * | 1/2009 | Biddulph | H01Q 1/38 343/833 |
| D586,743 | S | * | 2/2009 | Guccione | D13/107 |
| D594,438 | S | | 6/2009 | Wada | |
| D620,916 | S | * | 8/2010 | Wada | D14/149 |
| D635,955 | S | * | 4/2011 | Corrigan | D14/149 |
| D674,338 | S | | 1/2013 | Au Yeung | |
| D674,374 | S | | 1/2013 | Roberts | |
| D714,258 | S | * | 9/2014 | Montague | D14/221 |
| 2003/0053620 | A1 | | 3/2003 | Chen | |
| 2009/0268899 | A1 | * | 10/2009 | Tokuda | H04M 1/6033 379/420.02 |

OTHER PUBLICATIONS

Polycom VoiceStation 300, <URL: www.101Phones.com>, retrieved from Internet Jan. 31, 2008.

Polycom SoundStation2, <URL: www.101Phones.com>, retrieved from internet Jan. 31, 2008.

* cited by examiner

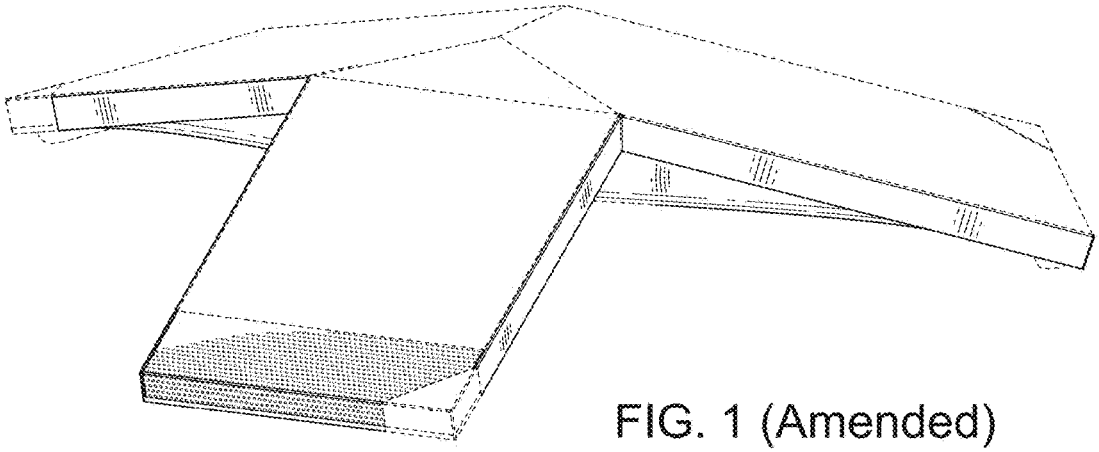
FIG. 1 (Amended)
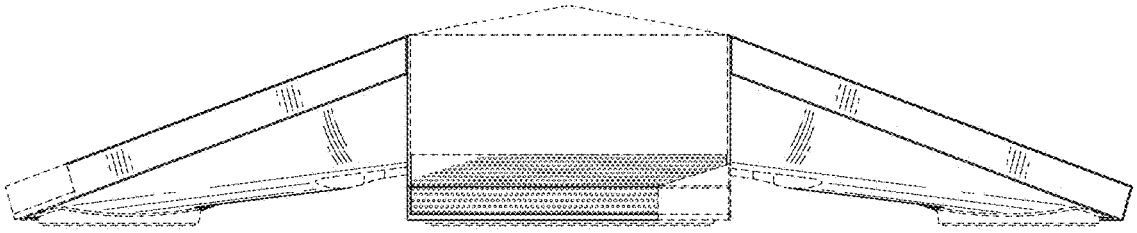
FIG. 2 (Amended)

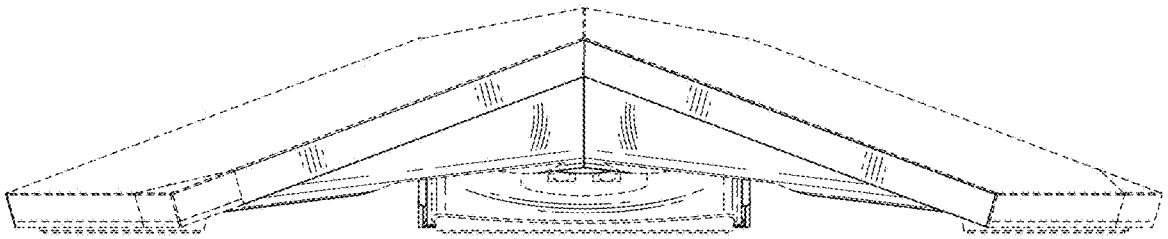
FIG. 3 (Amended)
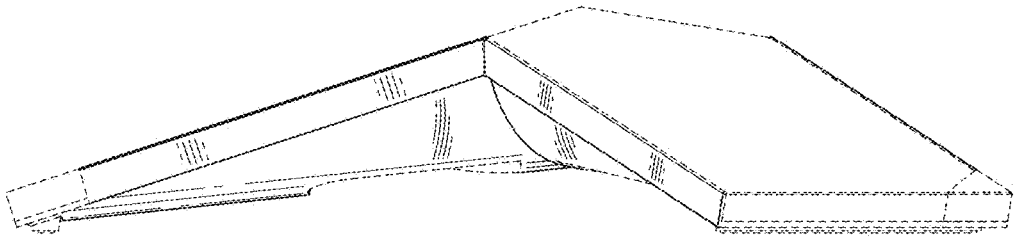
FIG. 4 (Amended)
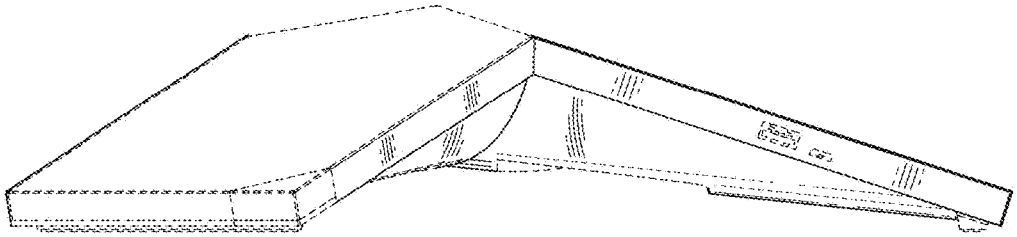
FIG. 5 (Amended)

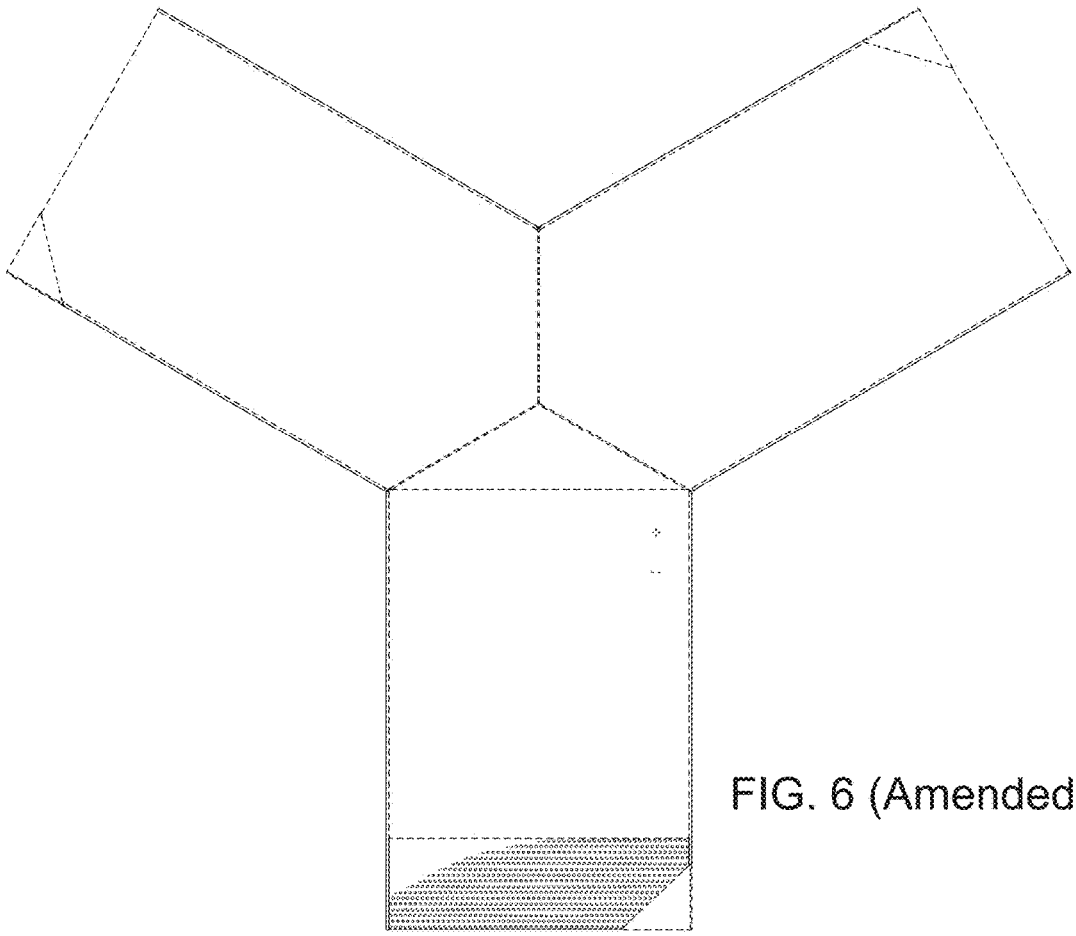
FIG. 6 (Amended)

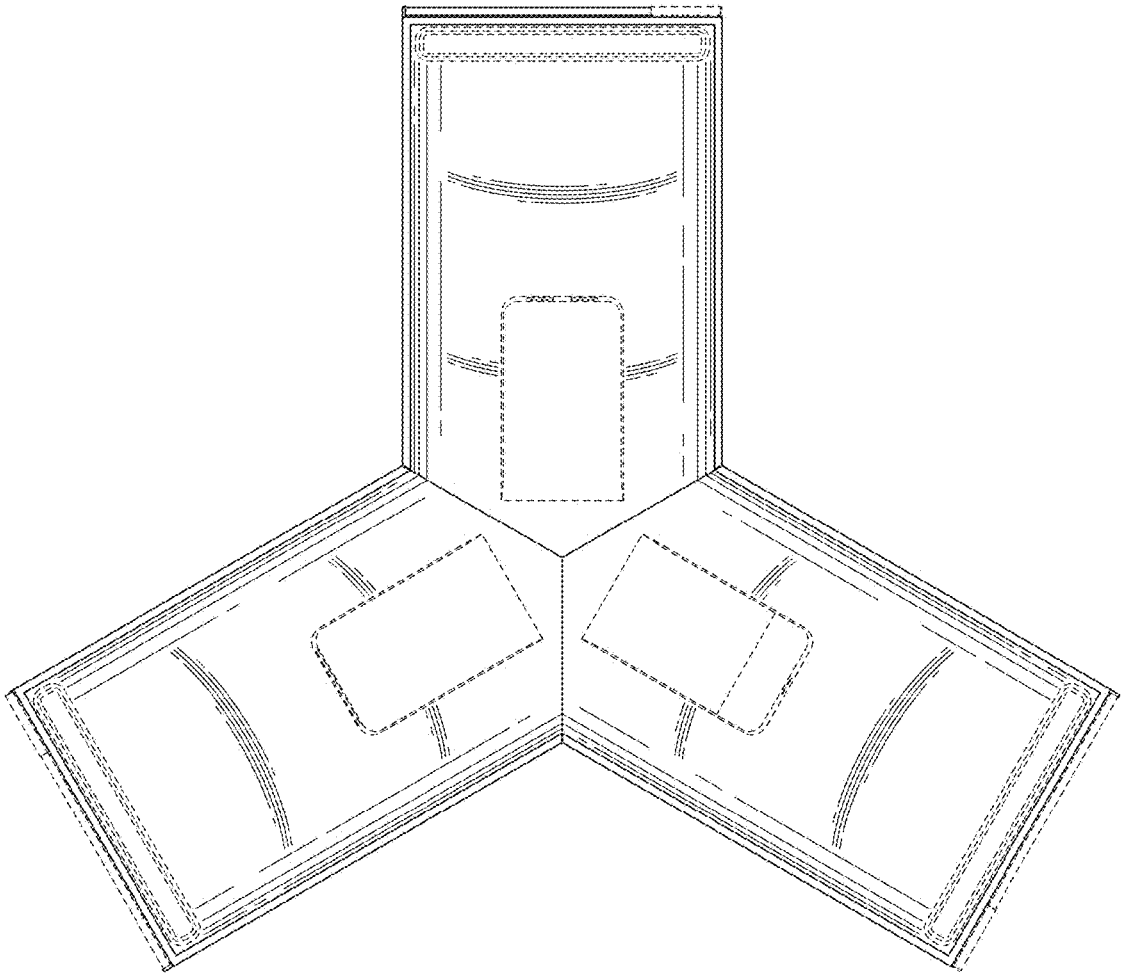
FIG. 7 (Amended)